United States Patent
Paul et al.

(10) Patent No.: US 9,519,503 B2
(45) Date of Patent: Dec. 13, 2016

(54) SYSTEMS AND METHODS FOR VIRTUAL MACHINE ATTRIBUTION WITH FAULT RESILIENT MEMORY TAG

(71) Applicant: Dell Products, L.P., Round Rock, TX (US)

(72) Inventors: Matthew Christian Paul, Austin, TX (US); Mukund P Khatri, Austin, TX (US); Sudhir Vittal Shetty, Austin, TX (US); Damon Earley, Austin, TX (US); Manoj Sharad Gujarathi, Austin, TX (US)

(73) Assignee: DELL PRODUCTS, L.P., Round Rock, TX (US)

(*) Notice: Subject to any disclaimer, the term of this patent is extended or adjusted under 35 U.S.C. 154(b) by 14 days.

(21) Appl. No.: 14/556,839

(22) Filed: Dec. 1, 2014

(65) Prior Publication Data

US 2016/0154661 A1    Jun. 2, 2016

(51) Int. Cl.
*G06F 9/455* (2006.01)
*G06F 9/48* (2006.01)
(Continued)

(52) U.S. Cl.
CPC ......... *G06F 9/45558* (2013.01); *G06F 9/4856* (2013.01); *G06F 9/45533* (2013.01);
(Continued)

(58) Field of Classification Search
None
See application file for complete search history.

(56) References Cited

U.S. PATENT DOCUMENTS

| | | | |
|---|---|---|---|
| 2003/0163653 A1* | 8/2003 | Skendzic | G06F 11/1666 711/153 |
| 2009/0216985 A1* | 8/2009 | O'Connor et al. | G06F 11/1076 711/170 |

(Continued)

FOREIGN PATENT DOCUMENTS

EP    2845088 A1 *    3/2015    .......... G06F 11/1666

OTHER PUBLICATIONS

Far et al, Autonomic Workload and Resource Management of Cloud Computing Services, 2014, IEEE International Conference on Cloud and Autonomic Computing, pp. 101-110.*

(Continued)

*Primary Examiner* — Abu Ghaffari
(74) *Attorney, Agent, or Firm* — Fogarty, L.L.C.

(57) ABSTRACT

Systems and methods for Virtual Machine (VM) attribution with hardware information. In an illustrative, non-limiting embodiment, an Information Handling System (IHS) may include a Central Processing Unit (CPU) and a memory coupled to the CPU, the memory having program instructions stored thereon that, upon execution by the CPU, cause the IHS to: provide a management console configured to manage a plurality of hypervisors, each hypervisor configured to be executed in a different one of a plurality of physical servers distinct from the IHS, each hypervisor further configured to create and run at least one Virtual Machine (VM); identify, via the management console, a hardware capability of a given one of the plurality of physical servers; and assign the VM, by the management console, to the given physical server in response to the identification of the hardware capability.

13 Claims, 3 Drawing Sheets

(51) Int. Cl.
*G06F 11/07* (2006.01)
*G06F 9/50* (2006.01)

(52) U.S. Cl.
CPC .......... *G06F 9/5077* (2013.01); *G06F 11/073* (2013.01); *G06F 11/0706* (2013.01); *G06F 2009/4557* (2013.01); *G06F 2009/45562* (2013.01); *G06F 2212/1032* (2013.01)

(56) References Cited

U.S. PATENT DOCUMENTS

| | | | | |
|---|---|---|---|---|
| 2009/0307439 A1* | 12/2009 | Jacobs | ................ | G06F 11/0712 711/153 |
| 2010/0250824 A1* | 9/2010 | Belay | ................ | G06F 9/45558 711/6 |
| 2010/0319001 A1* | 12/2010 | Jones | ................ | G06F 9/4411 718/108 |
| 2013/0132957 A1* | 5/2013 | Chen | ................ | G06F 9/5016 718/1 |
| 2013/0191831 A1* | 7/2013 | Goyal | ................ | G06F 9/46 718/100 |
| 2013/0304899 A1* | 11/2013 | Winkler | ................ | H04L 67/34 709/224 |
| 2013/0311823 A1* | 11/2013 | Kaplan | ................ | G06F 11/2023 714/15 |
| 2014/0059541 A1* | 2/2014 | Heninger | ................ | G06F 8/63 718/1 |
| 2014/0089725 A1* | 3/2014 | Ackaret | ................ | G06F 12/0653 714/6.1 |
| 2014/0123136 A1* | 5/2014 | Beda, III | ................ | G06F 9/45558 718/1 |
| 2014/0181806 A1* | 6/2014 | Abiezzi | ................ | G06F 9/45558 718/1 |
| 2014/0258446 A1* | 9/2014 | Bursell | ................ | G06F 15/177 709/217 |

OTHER PUBLICATIONS

IBM et al, System and method to optimize cache and memory affinity in a virutalized environment, ip.com, 2006, pp. 1-5.*

Mich et al, Clearing the clouds away from the true potential and obstacles posed by this computing capability, 2010, Communication of the ACM, vol. 53 No. 4 pp. 50-58.*

Ming et al, Prevent VM Migration in Virtualized Clusters via Deadline Driven Placement Policy, 2013, IEEE International Conference on Cloud Computing Technology and Science, pp. 599-606.*

* cited by examiner

SYSTEMS AND METHODS FOR VIRTUAL MACHINE ATTRIBUTION WITH FAULT RESILIENT MEMORY TAG

FIELD

This disclosure relates generally to computer systems, and more specifically, to systems and methods for Virtual Machine (VM) attribution with hardware information.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A virtual machine (VM) is a software emulation of a physical IHS. Classification of VMs may be based on the degree to which they implement functionality of targeted real machines. For example, "full virtualization" VMs provide a complete substitute for the targeted IHS and a level of functionality required for the execution of a complete operating system (OS). Conversely, "process" VMs may be configured to execute a software program by providing an abstracted and/or platform-independent execution environment.

SUMMARY

Embodiments of systems and methods for Virtual Machine (VM) attribution with hardware information are described herein. In an illustrative, non-limiting embodiment, an Information Handling System (IHS) may include a Central Processing Unit (CPU) and a memory coupled to the CPU, the memory having program instructions stored thereon that, upon execution by the CPU, cause the IHS to: provide a management console configured to manage a plurality of hypervisors, each hypervisor configured to be executed in a different one of a plurality of physical servers distinct from the IHS, each hypervisor further configured to create and run at least one Virtual Machine (VM); identify, via the management console, a hardware capability of a given one of the plurality of physical servers; and assign the VM, by the management console, to the given physical server in response to the identification of the hardware capability.

In some cases, the hardware capability may be absent from at least another one of the plurality of physical servers. Additionally or alternatively, the hardware capability may be absent from all other ones of the plurality of physical servers. The VM may be associated with a tag requesting the hardware capability. For example, the hardware capability may be a Fault Resilient Memory (FRM), a selected FRM zone, a selected one of a plurality of types of processors, and/or the presence of integrated Trusted Execution Technology (TXT).

The memory may also have program instructions stored thereon that, upon execution by the CPU, cause the IHS to: receive a request to migrate the VM; identify another given one of the plurality of physical servers that has the hardware capability; and transfer the VM to the other given physical server.

In another illustrative, non-limiting embodiment, a computer-implemented method may include identifying a hardware capability of a given one of a plurality of physical servers; and assigning a VM to the given physical server in response to the identification of the hardware capability. The method further comprises, prior to assigning the VM to the given physical server, associating with a tag with a user request for hardware capability. For example, the hardware capability may be an FRM, a selected FRM zone, a selected one of a plurality of types of processors, and/or silicon-based, integrated TXT.

In yet another illustrative, non-limiting embodiment, a non-transitory computer-readable medium may have program instructions stored thereon that, upon execution by an IHS, cause the IHS to identify a hardware capability of a given one of a plurality of physical servers; and assign a VM to the given physical server in response to the identification of the hardware capability. Again, in some cases, the hardware capability may be an FRM, a selected FRM zone, a selected one of a plurality of types of processors, and/or availability of TXT.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
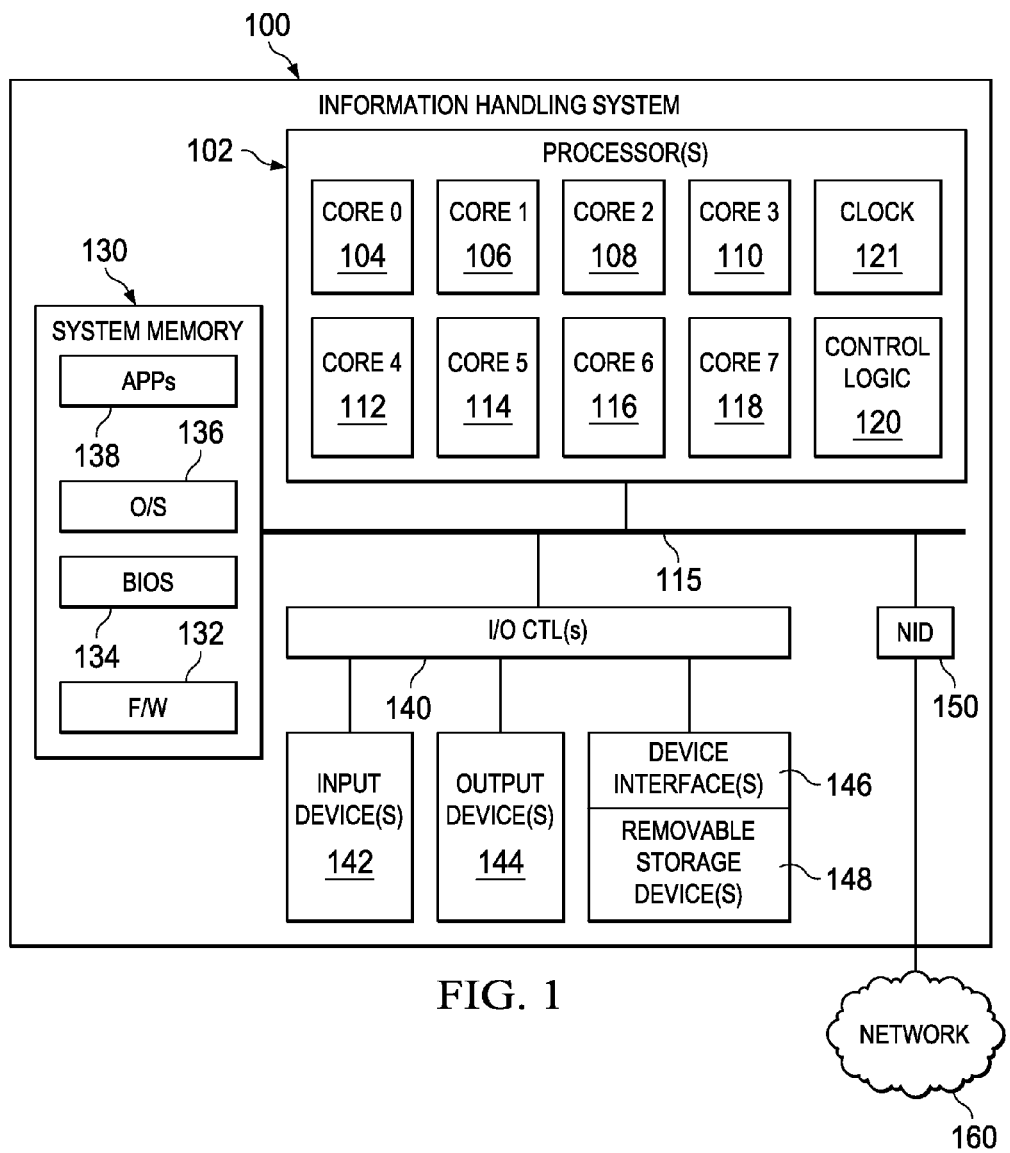
FIG. 1 is a block diagram of an example of an Information Handling System (IHS) configured to implement various systems and methods described herein according to some embodiments.

Systems and methods for Virtual Machine (VM) attribution with hardware information are described. As used herein, the term "Virtual Machine" refers to an Operating System (OS) or software application installed on emulated hardware, instead of being physically installed on a dedicated Information Handling System (IHS). In various implementations, an end user may have the same or similar experience on a VM as they would have on a physical IHS. A "hypervisor" or "Virtual Machine Manager" (VMM) is a specialized software configured to emulate an IHS's Central Processing Unit (CPU), memory, hard disk, network and/or other hardware resources; therefore enabling two or more VMs to share those same physical resources. In some embodiments, a hypervisor or VMM may emulate multiple VMs that are logically isolated from each other. For example, in some cases, two or more VMs may run different server OSs or applications on the same underlying physical HIS, concurrently or simultaneously.

Conventional hypervisors or VMMs are only aware of hardware data collected via the Common Information Model (CIM) or specific management plug-ins to their management stack. That is, the traditional data collection process does not include certain platform context information—such as security, Basic Input/Output System (BIOS) or redundancy features in a given IHS—that may be considered a priority for a given workload and/or user. For example, if a user wants to ensure that a given VM is always executed by a particular IHS or type of IHS (e.g., a server) where TXT (Trusted Execution Technology) is enabled, there is currently no mechanism for the hypervisor to set those policies and verify the feature set of the target IHS.

Particularly, TXT is the name of a computer hardware technology whose primary goals are: (a) attestation of the authenticity of an IHS and its OS; (b) assurance that an authentic OS starts in a trusted environment, which can then be considered trusted; and (c) provisioning of a trusted OS with additional security capabilities not available to an unproven one. In some implementations, a Trusted Platform Module (TPM) and cryptographic techniques may provide measurements of software and platform components so that system software as well as local and remote management applications may use those measurements to make trust decisions, thereby defending against software-based attacks aimed at stealing sensitive information by corrupting system and/or BIOS code, or modifying the platform's configuration.

As another example, there is currently no mechanism for tagging a VM to be placed into a proprietary protected memory sub-zone provided by an IHS to the hypervisor, such as a Fault Resilient Memory (FRM) or the like. Notably, FRM is a memory operating mode available on certain IHSs (e.g., DELL POWEREDGE 12th generation servers). The mode establishes an area of memory that is fault resilient and can be used by an OS supporting the FRM feature to load critical Applications/Services and the OS Kernel to maximize system availability. For example, FRMs may include BIOS-level APIs configured to communicate the address of an area of memory with enhanced protection to a hypervisor, so a hypervisor may place its memory footprint into that space. In some cases, users may want to wish to select one or more critical VMs into this same zone for the same level of protection. However, whereas the hypervisor may be cognizant of the space and may be capable of devising a method to place itself in that zone, there is currently no mechanism for the hypervisor or an administrator to place these critical VMs into this designated protected space.

More generally, the concept of assigning tags to communicate Original Equipment Manufacturer (OEM)—differentiated hardware features from a pool of servers to a hypervisor or Virtual Machine Manager (VMM) does not exist. Also, conventional hypervisors cannot leverage VM attribution/tagging to do VM placement on IHSs that have those hardware differentiated hardware capabilities. To address these and other problems, the inventors hereof have developed various systems and methods for VM attribution with hardware information.

In some embodiments, systems and methods described herein may provide the ability to tag each VM with particular IHS' hardware capabilities, which then allows a VMM and/or hypervisor to perform a more targeted and/or optimized placement of each such VM on selected hardware that has those capabilities. Such features enable hypervisor and/or VMM vendors to take advantage of that differentiation for better reliability and performance in the virtualization space.

In the following detailed description of exemplary embodiments of the disclosure, specific exemplary embodiments in which the disclosure may be practiced are described in sufficient detail a person of ordinary skill in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example IHS 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include Random Access Memory (RAM), one or more processing resources such as a CPU or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 130 via system interconnect 115. System interconnect 115 can be interchangeably referred to as a system bus, in one or more embodiments. System memory 130 can include therein a plurality of software and/or firmware modules including firmware (F/W) 132, BIOS 134, OS 136, and application(s) 138. The one or more software and/or firmware modules within system memory 130 can be loaded into processor(s) 102 during operation of IHS 100.

Processor(s) 102 include several processor cores, including core 0 104, core 1 106, core 2 108, core 3 110, core 4 112, core 5 114, core 6 116 and core 7 118. Cores 104-118 can communicate with each other and with control logic 120. Control logic 120 can control the operation of cores 104-118. According to an aspect of the described embodiments, control logic 120 may be configured to control the operating frequency and voltage or operating state of cores 104-118. Control logic 120 can also receive software and/or firmware modules from system memory 130 during the operation of processor(s) 102. Clock 121 is provided on processor(s) 102 and enables the generation of several different periodic frequency signals that can be applied to one or more of cores 104-118 within one or more processor(s) 102.

IHS 100 further includes one or more I/O controllers 140 which support connection by, and processing of signals from, one or more connected input device(s) 142, such as a keyboard, mouse, touch screen, or microphone. I/O controllers 140 also support connection to and forwarding of output signals to one or more connected output devices 144, such as a monitor or display device or audio speaker(s). Additionally, in one or more embodiments, one or more device interfaces 146, such as an optical reader, a universal serial bus (USB), a card reader, Personal Computer Memory Card International Association (PCMCIA) slot, and/or a High-Definition Multimedia Interface (HDMI), can be associated with IHS 100. Device interface(s) 146 can be utilized to enable data to be read from or stored to corresponding removable storage device(s) 148, such as a Compact Disk (CD), Digital Video Disk (DVD), flash drive, or flash memory card. Device interfaces 146 can further include General Purpose I/O interfaces such as $I^2C$, SMBus, and peripheral component interconnect (PCI) buses.

IHS 100 comprises a network interface device (NID) 150. NID 150 enables IHS 100 to communicate and/or interface with other devices, services, and components that are located external to IHS 100. These devices, services, and components can interface with IHS 100 via an external network, such as example network 160, using one or more communication protocols. Network 160 can be a local area network, wide area network, personal area network, and the like, and the connection to and/or between network and IHS 100 can be wired or wireless or a combination thereof. For purposes of discussion, network 160 is indicated as a single collective component for simplicity. However, it is appreciated that network 160 can comprise one or more direct connections to other devices as well as a more complex set of interconnections as can exist within a wide area network, such as the Internet.

A person of ordinary skill in the art will appreciate that the hardware components and basic configuration depicted in FIG. 1 and described herein may vary. For example, the illustrative components within IHS 100 are not intended to be exhaustive, but rather are representative to highlight components that can be utilized to implement systems and methods described herein. For example, other devices/components may be used in addition to or in place of the hardware depicted. The depicted example does not convey or imply any architectural or other limitations with respect to the presently described embodiments and/or the general disclosure.

Figure 2:
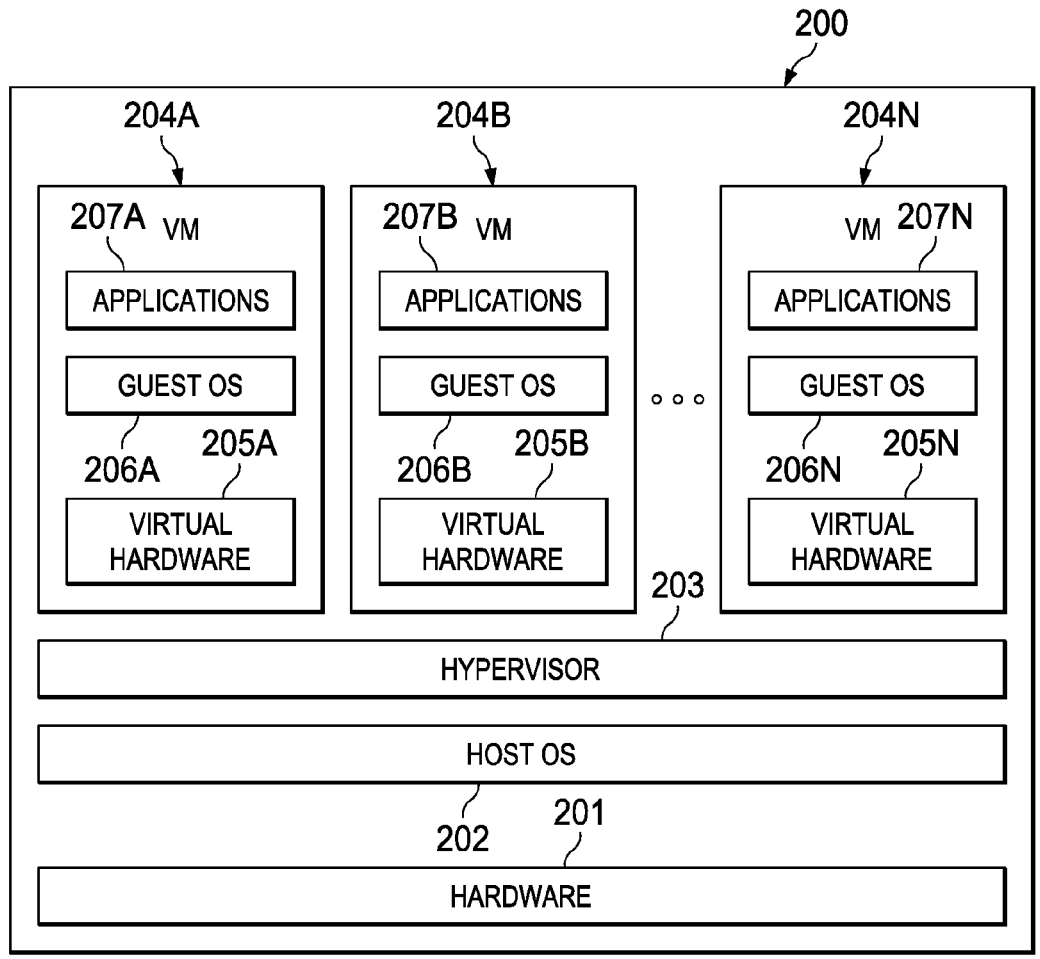
FIG. 2 is a block diagram of an example of an IHS configured to provide a virtualized environment described herein according to some embodiments.

FIG. 2 is a block diagram of an example of IHS 200 configured to provide a virtualized environment, according to some embodiments. Particularly, IHS 200 includes hardware 201 (e.g., CPU. BIOS, memory, etc.) upon which host OS 202 is executed. Hypervisor 202 is then executed on top of host OS 202, and supports any number of virtual machines 204A-N. Particularly, hypervisor 202 provides virtual hardware 205A-N to VMs 204A-N, respectively. Guest OSs 206A-N run on virtual hardware 205A-N, and one or more applications 207A-N may be executed by each of guest OSs 206A-N, respectively.

In operation, hypervisor 202 presents guest operating systems 206A-N with their own respective virtual hardware platforms 205A-N. In some embodiments, multiple instances of a variety of different operating systems may share virtualized hardware resources 205A-N within any of VMs 204A-N. Moreover, hypervisor 202 may be configured to receive, from a user, an indication that a given one of VMs 204A-N should be executed upon a selected IHS having a particular hardware feature. For instance, IHS 200 may be selected to execute VM 204A in response to VM 204A having been tagged by a user as requiring a particular hardware capability, and hardware 201 of IHS 200 having that capability.

As a person of ordinary skill in the art will understand in light of this disclosure, although the virtualized environment of FIG. 2 is illustrated as being a "type II" or "hosted" environment, a "type I" or "bare metal" environment with hypervisor 203 running directly on hardware layer 201 is also within the scope of this disclosure (e.g., host OS layer 202 is absent).

Figure 3:
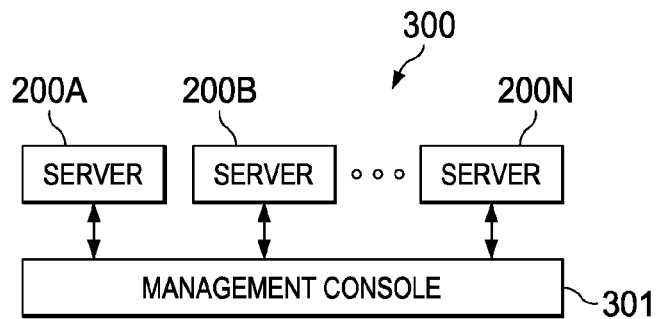
FIG. 3 is a block diagram of an example of a management console configured to implement a method for VM attribution with hardware information according to some embodiments.

FIG. 3 is a block diagram of an example of distributed virtualization environment 300 where management console 301 is configured to implement a method for VM attribution with hardware information, according to some embodiments. As shown, management console 301 may be executed by one or more IHSs. Moreover, management console 301 may be configured to manage the operation of a plurality of physical servers 200A-N, and each of servers 200A-N may be similar to IHS 200 shown in FIG. 2.

In some cases, a given one of a plurality of physical IHSs 200A-N may be selected by management console 301 to execute a given VM. The selection may be based, for example, upon a user's request that the VM be preferably executed on a server having particular hardware capability. Examples of such capabilities include, but are not limited to, a Fault Resilient Memory (FRM), a selected FRM zone, a selected one of a plurality of different types of processors (e.g., whether the type of processor has silicon-based, integrated Trusted Extension Technology (TXT), etc.), or the like. Additionally or alternatively, management console 301 may receive a request to migrate a VM tagged with a given hardware feature, it may identify another physical servers that has that hardware feature, and may transfer the VM to the identified server.

Figure 4:
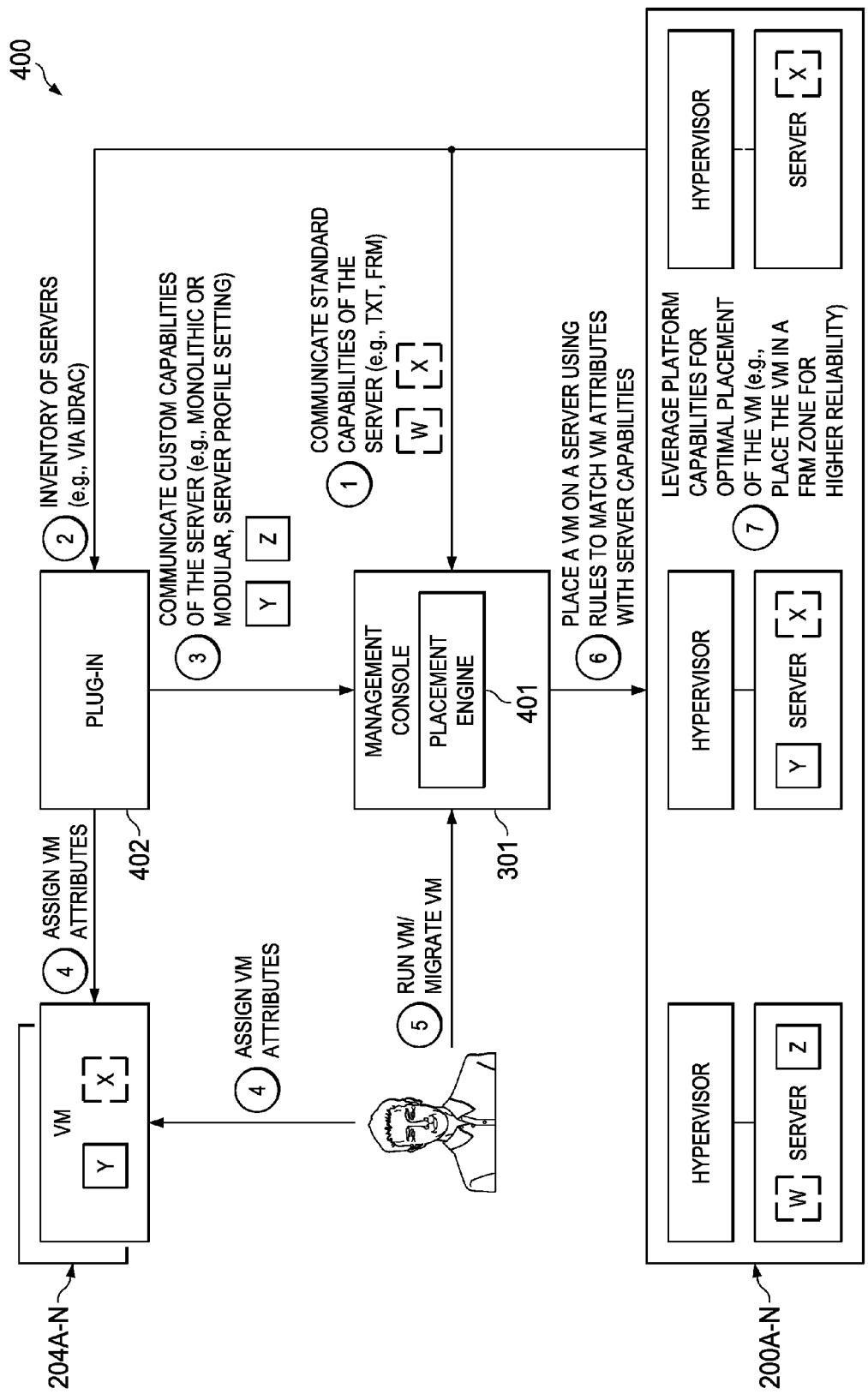
FIG. 4 is a flowchart illustrating a method for VM attribution with hardware information according to some embodiments.

FIG. 4 is a flowchart of method 400 for VM attribution with hardware information. In various embodiments, method 400 may be performed by one or more management consoles, such as console 301 of FIG. 3, in conjunction with one or more hypervisors, such as hypervisor 202 of FIG. 2, each running on one or more physical IHS, such as IHS 100 of FIG. 1.

At step 1, method 400 includes communicating certain hardware capabilities (e.g., FRM, TXT, etc.), here represented as "W" and "X," from one or more servers 200A-N to placement engine 401 of management console 301. At step 2, method 400 includes obtaining, by Plug-in 402 via an integrated DELL Remote Access Controller (iDRAC), for example, an inventory of servers 200A-N. At step 3, method 400 includes communicating additional or custom hardware capabilities (e.g., monolithic or modular, server profile setting), here represented as "Y" and "Z," from Plug-in 402 to management console 301.

At step 4, method 400 includes assigning to a given VM, by a user and/or Plug-in 402, one or more attributes, here represented as "Y" and "X." At step 5, a user may request that management console 301 run and/or migrate the given VM. At step 6, management console 301 may place the VM on one of servers 200A-N having the one or more attributes "Y" and "X" under control of the server's respective hypervisor. For example, in some cases at step 7, method 400 may include leveraging platform's capabilities for optimal placement of the VM (e.g., place the VM in a selected FRM zone for higher reliability).

In summary, method 400 may involve tagging a VM with desired hardware attributes to enable the a hypervisor, VMM, or management console to make optimal placement decisions on servers that supports those hardware capabilities. The hypervisor reports hardware capabilities of each server to the management console, and a plug-in can inventory manufacture-specific features via a lifetime controller (e.g., iDRAC) or the like. These features may be unique to a particular manufacturer, such as server form factor (e.g., modular vs. monolithic), platform profile, redundancy characteristics, etc.)

The Plug-in can communicate those features to the management console. The user or administrator assigns specific VM tags/attributes to select VMs. For example, the user may tag a particular VM to run on a server with FRM capabilities and place it in an FRM zone, or they may tag the VM to run on a server with TXT capabilities. Additionally, the user may specify a specific zone (e.g., zone 2 if there are 2 or more FRM zones). The zone instance specification may be implemented for advanced scenarios where the user may want to place 2 VMs in an FRM zone and either co-locate the VMs in the same zone due to data affinity or specify different zones to ensure better performance. This example may be further extended to other hardware instances (e.g., specifying CPU socket affinity to place two specific VMs on same socket or different sockets).

The user then triggers a request to run/place a VM or migrate a VM. The management console identifies the VM tags/attributes to select a server that has the appropriate capabilities. For instance, in the previous example, the management console may only select servers that are FRM enabled (both the hypervisor and the server). Next, the hypervisor may leverage the VM tags for specific placement on the hardware (e.g., a specific FRM zone).

Accordingly, in various embodiments, systems and methods for VM attribution with hardware information may include the introduction of a process to tag a VM with server-centric capabilities. These may be standard capabilities or manufacturer-differentiated capabilities. Moreover, these systems and methods enable improved or optimized placement of a VM on the appropriate computer resource that has those capabilities. Also, these systems and methods provide the ability to place a VM on a specific hardware instance (e.g., FRM zone, CPU socket) within a target server.

In the above described flowchart(s), one or more of the methods may be embodied in a computer readable medium containing computer readable code such that a series of functional processes are performed when the computer readable code is executed on a computing device. In some implementations, certain operations methods may be combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable a person of ordinary skill in the art to understand the disclosure for various embodiments with various modifications as are suited to the particular use contemplated.

The invention claimed is:

1. An Information Handling System (IHS), comprising:
    a Central Processing Unit (CPU); and
    a memory coupled to the CPU, the memory having program instructions stored thereon that, upon execution by the CPU, cause the IHS to:
        provide a management console configured to manage a plurality of hypervisors, each hypervisor configured to be executed in a different one of a plurality of physical servers distinct from the IHS, each hypervisor further configured to create and run at least one Virtual Machine (VM), wherein the VM is associated with a tag requesting a Fault Resilient Memory (FRM);
        identify, via the management console, an FRM of one of the plurality of physical servers;
        assign a first VM, by the management console, to a selected one of a plurality of zones in the FRM of the identified physical server; and
        assign a second VM, by the management console, to the selected zone of the FRM of the identified physical server in response to a determination that the first VM and the second VM have data affinity.

2. The IHS of claim 1, wherein the FRM is absent from at least another one of the plurality of physical servers.

3. The IHS of claim 1, wherein the FRM is absent from all other ones of the plurality of physical servers.

4. The IHS of claim 1, the memory having program instructions stored thereon that, upon execution by the CPU, cause the IHS to:
    receive a request to migrate the first VM;
    identify another one of the plurality of physical servers that has the FRM; and
    transfer the first VM to the identified another physical server.

5. A computer-implemented method, comprising:
    identifying a Fault Resilient Memory (FRM) of one of a plurality of physical servers;
    receiving a user request for a virtual machine (VW), wherein the request includes a tag associated with the FRM;
    assigning a first VM to a selected zone of the FRM of the identified physical server in response to the identification of the FRM; and
    assigning a second VM to the selected zone of the FRM of the identified physical server in response to a determination that the first VM and the second VM have data affinity.

6. The computer-implemented method of claim 5, the memory having program instructions stored thereon that, upon execution by the CPU, cause the IHS to:
    receive a user request to migrate the VM;
    identify another one of the plurality of physical servers that has the FRM; and
    transfer the VM to the identified another physical server.

7. The computer-implemented method of claim 5, wherein the FRM is absent from at least another one of the plurality of physical servers.

8. The computer-implemented method of claim 5, wherein the FRM is absent from all other ones of the plurality of physical servers.

9. The computer-implemented method of claim 5, further comprising:
    receiving a request to migrate the first VM;
    identifying another one of the plurality of physical servers that has the FRM; and
    transferring the first VM to the identified another physical server.

10. A memory device having program instructions stored thereon that, upon execution by an Information Handling System (IHS ), cause the IHS to:
    identify a Fault Resilient Memory (FRM)of one of a plurality of physical servers;
    receive a user request for a virtual machine (VM), wherein the request includes a tag associated with the FRM;
    assign a first VM to a selected zone of the FRM of the identified physical server in response to the identification of the FRM; and assign a second VM to the selected zone of the ERM of the identified physical server in response to a determination that the first VM and the second VM have data affinity.

11. The memory device of claim 10, wherein the FRM is absent from at least another one of the plurality of physical servers.

12. The memory device of claim 10, wherein the FRM is absent from all other ones of the plurality of physical servers.

13. The memory device of claim 10, wherein the program instructions, upon execution by the IHS, cause the IHS to:
   receive a request to migrate the first VM;
   identify another one of the plurality of physical servers that has the FRM; and
   transfer the first VM to the identified another physical server.

\* \* \* \* \*

UNITED STATES PATENT AND TRADEMARK OFFICE
CERTIFICATE OF CORRECTION

PATENT NO. : 9,519,503 B2  
APPLICATION NO. : 14/556839  
DATED : December 13, 2016  
INVENTOR(S) : Matthew Christian Paul et al.

Page 1 of 1

It is certified that error appears in the above-identified patent and that said Letters Patent is hereby corrected as shown below:

In the Claims

In Column 10, Line 26, Claim 5, delete "(VW)," and insert -- (VM), --, therefor.

In Column 10, Line 59, Claim 10, delete "(IHS )," and insert -- (IHS), --, therefor.

In Column 10, Line 60, Claim 10, delete "(FRM)of" and insert -- (FRM) of --, therefor.

In Column 11, Line 1, Claim 10, delete "ERM" and insert -- FRM --, therefor.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*